United States Patent [19]

Kobayashi

[11] Patent Number: 4,673,956

[45] Date of Patent: Jun. 16, 1987

[54] REDUCED VIBRATION IN A TWO PART ASSEMBLY FOR AN IMAGE RECORDING APPARATUS

[75] Inventor: Hiroo Kobayashi, Tokyo, Japan

[73] Assignee: Canon Kabushiki Kaisha, Tokyo, Japan

[21] Appl. No.: 899,781

[22] Filed: Aug. 22, 1986

Related U.S. Application Data

[63] Continuation of Ser. No. 842,711, Mar. 19, 1986, abandoned, which is a continuation of Ser. No. 575,223, Jan. 30, 1984, abandoned.

[30] Foreign Application Priority Data

Feb. 9, 1983 [JP] Japan ............................ 58-18199[U]

[51] Int. Cl.[4] ..................... G01D 15/06; G01D 15/08; G03G 15/00

[52] U.S. Cl. .................................... 346/160; 346/145; 355/3 DR

[58] Field of Search .................. 346/160, 160.1, 76 L, 346/109, 108, 145; 355/3 DR, 3 R; 358/302

[56] References Cited

U.S. PATENT DOCUMENTS 4,188,113 2/1980 Hiraga .................................. 355/51
4,284,345 8/1981 Sugiyama et al. ............. 355/3 R X
4,327,990 5/1982 Tago .................................. 355/3 R
4,336,994 6/1982 Banton ........................... 355/3 R X
4,416,536 11/1983 Itoh et al. ........................ 355/14 R

FOREIGN PATENT DOCUMENTS 3004142 8/1980 Fed. Rep. of Germany .
55-144263 11/1980 Japan .
55-144264 11/1980 Japan .
56-64362 6/1981 Japan .
57-40282 5/1982 Japan .
57-152270 9/1982 Japan .

*Primary Examiner*—E. A. Goldberg
*Assistant Examiner*—Linda M. Peco
*Attorney, Agent, or Firm*—Fitzpatrick, Cella, Harper & Scinto

[57] ABSTRACT

An image forming apparatus includes a rotatable mirror for scanningly deflecting a laser beam modulated in accordance with information to be recorded, a movable photosensitive member to be scanned by the modulated laser beam, an assembly for containing therein the rotatable mirror and the photosensitive member. The assembly includes a first part and a second part supported to the first part rotatably about a pivot. The rotatable mirror is located away from the exposure station toward or beyond the pivot.

9 Claims, 2 Drawing Figures

REDUCED VIBRATION IN A TWO PART ASSEMBLY FOR AN IMAGE RECORDING APPARATUS

This application is a continuation of application Ser. No. 842,711 filed Mar. 19, 1986 now abandoned, which is a continuation of application Ser. No. 575,223 filed Jan. 30, 1984 now abandoned.

BACKGROUND OF THE INVENTION

1. Field of the Invention

The present invention relates to an image forming apparatus wherein an image is formed with an information beam which corresponds to the information signal to be recorded.

2. Description of the Prior Art

In the apparatus of this type, a beam repeatedly scans a photosensitive member in a major scanning direction with the use of beam deflecting means, such as a polygonal mirror and a galvanomirror, while at the same time, the photosensitive member is moved in a minor scanning direction. Thus, the photosensitive member is scanned along a number of scanning lines spaced regularly, so that an image is formed thereon in accordance with the information signals.

On the other hand, it has been proposed in the field of copying machines, as disclosed in U.S. Pat. No. 4,284,345, for example, that the apparatus is formed with a first assembly and a second assembly, the former being supported on the second assembly rotatably about a shaft, so as to facilitate the maintenance or servicing to the internal elements or parts around the photosensitive member and to facilitate the removal of jammed transfer materials from the apparatus. Such a proposal has been put into practice particularly in small sized copying machines.

This type of copying machine does not have sufficient mechanical rigidity as a whole of the apparatus, with the result that there easily occur vibrations within the apparatus upon the occasion of an external vibration or a vibration of a movable member in the apparatus. Those vibrations hardly influence the quality of the resultant image in the copying machines wherein an original is directly imaged on the photosensitive member through a lens.

However, the vibrations cannot be neglected in the image forming apparatus of the type wherein the photosensitive member is scanned in the major scanning direction by a beam modulated in accordance with the information signal to be recorded and scanned in the minor scanning direction by moving the photosensitive member in the minor scanning direction. That is, when the vibration of the optical system, particularly that of the deflecting means, becomes large, the pitches between the scanning lines, which must be constant, may vary and the speed of the beam scanning in the main scanning direction may also vary so that the resolution of the resultant image is degraded.

SUMMARY OF THE INVENTION

Accordingly, the principal object of the present invention is to provide a divisible type image forming apparatus wherein an image is formed by scanning a recording material with an information beam produced in accordance with a signal of information to be recorded.

Another object of the present invention is to provide an apparatus of the above type, wherein the possible influence of the vibration which can often occur is minimized.

These and other objects, features and advantages of the present invention will become more apparent upon a consideration of the following description of the preferred embodiment of the present invention taken in conjunction with the accompanying drawings.

DESCRIPTION OF THE PREFERRED EMBODIMENT

Figure 1:
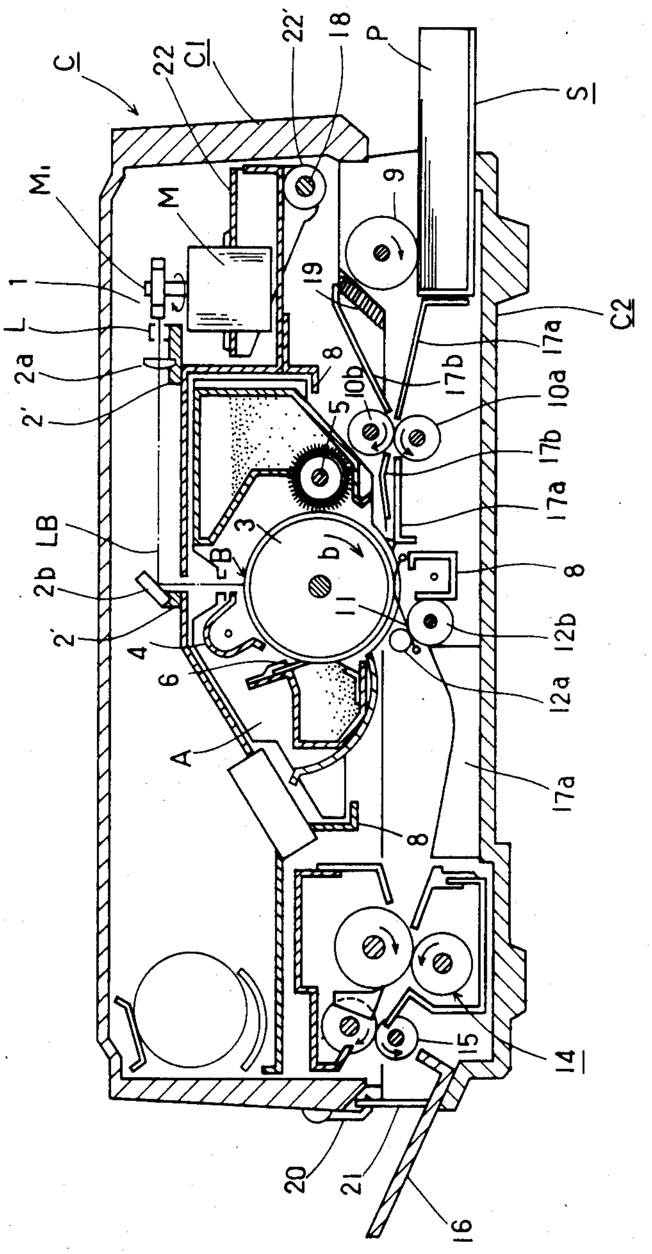
FIG. 1 shows a cross-section of an apparatus according to an embodiment of the present invention when the first part assembly of the apparatus is closed.

FIG. 1 is a cross-sectional view of an apparatus according to an embodiment of the present invention. The apparatus C is shown as having a first part assembly C1 which constitutes an upper part of the apparatus and a second part assembly C2 which constitutes a lower part. The first part assembly C1 is closed to the second part assembly C2 in the state as shown in FIG. 1. In this state, a surface of an electrophotographic photosensitive member or drum 3 is scanned, while being rotated, with the laser beam LB to produce an image.

Figure 2:
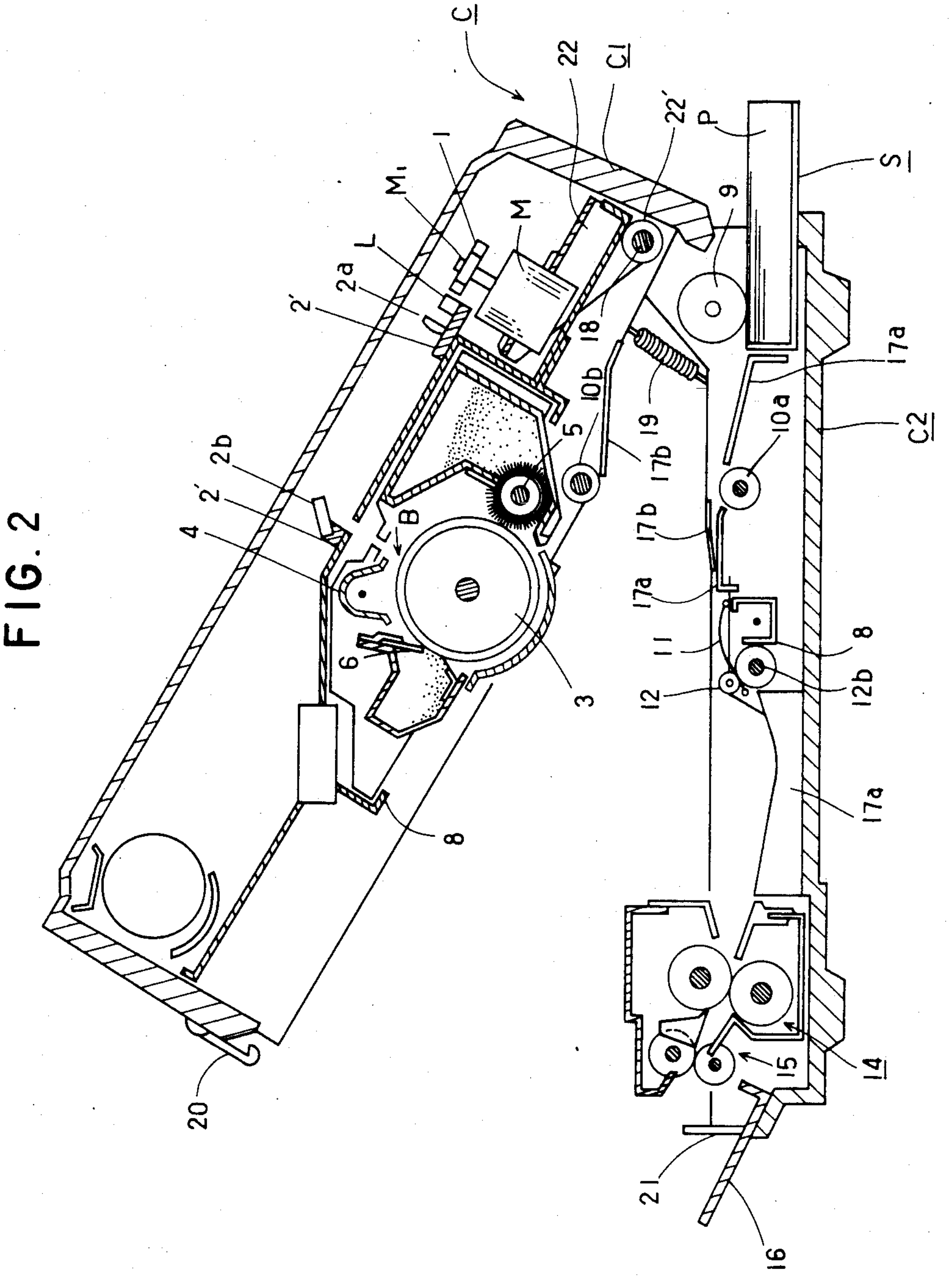
FIG. 2 shows a cross-section of the same apparatus when the first part assembly is opened.

FIG. 2 is a cross-sectional view of the same apparatus, which, however, is shown as in the state that the first part assembly C1 is opened with respect to the second part C2. In this state, no images can be formed, but the jammed paper can be removed without difficulty, or the internal parts of the machine can easily be accessed and serviced.

The apparatus includes a polygonal mirror 1 fixed to an output rotatable shaft M' of a driving motor M, a semiconductor laser generator L, an imaging lens 2*a* and a mirror 2*b*, which are fixedly secured in the upper part C1 by stays 2' or the like.

The apparatus contains therein a unit A which contains, in turn, as a unit, the electrophotographic photosensitive drum 3 which is rotatable in the sense shown by an arrow b, a charger 4, a developing device 5 and a cleaner 6. The unit A is supported by a guide 8 fixed on the upper part C1. The unit A is detachably mounted into the apparatus by pushing it into the apparatus in the direction perpendicular to the drawing of FIG. 1, and it can be removed therefrom by retracting it in the opposite direction.

To the lower part assembly C2, a detachable cassette containing transfer materials P is loaded. The apparatus further includes a pick-up roller 9, registering rollers 10*a* and 10*b*, a transfer corona discharger 8, a separation belt adapted to be in contact with a marginal lateral part of the transfer material, separation rollers 12*a* and 12*b* for cooperating with said belt to grip the transfer material at the lateral side where the separation belt exists, a fixing device 14, paper receiving tray 16, paper guiding plates 17*a* and 17*b* for guiding the transfer material P. Among those elements, the transfer discharger 8, the rollers 9, 10*a*, 12*a*, 12*b* and 15, the separation belt 11, the guiding plates 17*a* and the fixing device 14 are provided in the lower part C2, while the roller 10*b* and the guiding plates 17*b* are provided in the upper part C1.

In the state shown in FIG. 1, i.e., the state of the upper part C1 being closed to the lower part C2, the drum 3 rotates in the direction of arrow b, and it is first uniformly charged by the charger 4, and then exposed, at an exposure station B, to a laser beam LB (information beam) which is modulated in accordance with the signals of information to be recorded, while the laser beam LB is being deflected in the direction (major scanning direction) substantially perpendicular to that of the movement of the drum 3 surface. The drum 3 is scanned in the minor scanning direction by the rotation of the drum 3. An electrostatic latent image is formed by the beam application to the drum 3 and then developed by a developing device 5 having a magnet roller and a toner container.

The transfer material P, shown as a sheet of paper, which is contained in the cassette S, is taken out thereof by the pick-up roller 9 and fed to the image transfer station by registering upper roller 10*b* and lower roller 10*a* whose operation is so timed that the sheet can be synchronized with the image formed on the drum 3. The toner image on the drum 3 is transferred onto the sheet P by the action of the transfer charger 8. The sheet P is then separated from the drum 3 by the cooperative action of the separating belt 11 and the separating roller 12*a* and 12*b* (or a separation corona discharger) and then guided by the guiding plate 17*a* to the fixing device, where the toner image is fixed on the sheet P. The sheet P is then discharged to the tray 16. To the guide 17*a*, the back face of the sheet, i.e., the face not bearing the image, is contacted during the transportation of the sheet P. The surface of the drum 3, after the toner image has been transferred, is cleaned by a cleaning device 6, thus becoming free from the residual toner particles.

The laser beam LB is produced by a semiconductor laser means L which is driven in accordance with the signals of information outputted from a computer, word processor, original reading device of a facsimile machine or the like. Otherwise, the laser beam may be produced by a laser source and then modulated in accordance with the signals of information by the use of a modulator, such as an acousto-optic element. In any event, the laser beam LB from the laser source L is scanningly deflected in the major scanning direction by the polygonal mirror 1 rotated by the motor M. The beam LB is imaged as a spot on the drum 3 by a lens 2*a* which has a so-called f·θ characteristics. Such a lens is well-known. A mirror 2*b* is effective to deflect the optical path and direct the beam LB to the exposure station B.

As described hereinbefore, the apparatus C is divisible into the two parts, the upper part assembly (first part) C1 and the lower part assembly (second part) C2. The lower part C2 has a shaft 18 adjacent an end of the apparatus near the paper feeding station. The shaft 18 supports the upper part C1 adjacent an end thereof. In other words, the upper part C1 is coupled to the lower part C2 pivotably about the shaft 18. Between the upper part C1 and the lower part C2, there is a spring 19 which normally urges the upper part C1 upwardly to open it. The spring 19 pivots the upper part C1 to the position shown in FIG. 2 when a locking mechanism which will be described hereinafter is released. The force of the spring 19 may be so strong that the upper part C1 is lifted or pivoted by the force of the spring plus the operator's force given upwardly, not only by the spring force.

When the upper part C1 is raised from the lower part C2, as shown in FIG. 2, the apparatus C is divided along the passage of the transfer material P so as to widely open the passage. This makes easier the removal of a sheet jammed in the passage and the maintenance operation for the internal elements.

The apparatus further includes a hook 20 swingably provided in the upper part C1, which is engageable with a latch 21 provided in the lower part C2. The apparatus in the closed state as shown in FIG. 1 is made divisible into the two parts by manually disengaging the hook 20 from the latch 21. On the contrary, the apparatus is put into the closed state by manually pushing the upper part C1 downwardly against the spring 19 force and engaging the hook 20 with the latch 21. Thus, the apparatus is locked into the closed state against the resilient force of the spring.

The polygonal mirror 1 for receiving the laser beam and scanningly deflecting the same is located at the shaft side with respect to the exposure station. That is, the polygonal mirror 1 is located at a position which is away from the exposure station toward or beyond the shaft 18. In the shown embodiment, the polygonal mirror 1 is fixed to the output shaft M' of the motor M which in turn is secured to a supporting plate 22 fixed to the upper part C1 at a position which is nearer to the shaft 18 than to the photosensitive drum 3. The supporting plate 22 has a hole 22' into which the shaft is engaged. That is, the supporting plate 22 is rotatably supported on the shaft 18.

If vibration occurs in the machine as shown in FIGS. 1 and 2, the vibration (amplitude thereof) is larger with the distance from the shaft 18. Therefore, if the polygonal mirror 1 is disposed to the opposite side with respect to the exposure station, the vibration of the polygonal mirror 1 is larger. Since the change of the angle of reflection is twice the change of the angle of the reflecting surface, the intervals between the adjacent scanning lines vary considerably, also the scanning speed in the major scanning direction varies so that the resultant image has a poorer resolution. Where the polygonal mirror 1 and the driving mechanism therefor (motor in the embodiment) are located at such an assumed position, the vibration can easily occur during the operation thereof, so that the above-described inconvenience arises more often.

According to the present invention, the scanning (deflecting) means including the rotatable polygonal mirror 1 and the driving mechanism therefor is located at the shaft 18 side, as seen from the exposure station B. By doing so, the polygonal mirror 1 is located adjacent to the shaft 18 where the vibration is not easily produced so that the above-described inconvenience can be avoided. Thus, the intervals of the scanning lines are maintained constant and the variation of the scanning speed can be eliminated. In the disclosed embodiment, the motor supporting plate 22 to which the motor M is fixed is coupled and engaged to the shaft 18 itself. This arrangement is effective to further suppress the vibration to make the scanning line intervals and the scanning speed constant. The supporting plate 22 may be fixed onto the upper part C1 without directly coupling to the shaft 18 itself. The polygonal mirror 1 and motor M are preferably located as near as possible to the shaft 18 rather than to the exposure station B.

In the disclosed embodiment, the lens 2*a* and the laser source L are fixed to the same side as with the polygonal mirror 1 with respect to the exposure station B. By this arrangement, the possible vibrations of the lens 2*a* and the laser source L can be minimized so as to provide an even better quality image.

In place of the polygonal mirror 1, a reciprocably rotatable galvano-mirror may be used.

As described in the foregoing, according to the present invention, the technique of image formation by scanning a moving photosensitive member with an information beam produced in accordance with the information to be recorded and the technique of making the apparatus divisible into two parts, which are rotatable about a shaft, can be combined together without the occurrence of blurred or poor resolution image. Also, according to the present invention, the possible shock to the apparatus which may be caused at the time of the opening and closing of the apparatus and the possible influence of the vibration to the scanning means are so small that the accuracy of the scanning means can be maintained.

While the invention has been described with reference to the structures disclosed herein, it is not confined to the details set forth and this application is intended to cover such modifications or changes as may come within the purposes of the improvements or the scope of the following claims.

What is claimed is:

1. An image recording apparatus, comprising:

means for producing an information beam in accordance with an information signal to be recorded;

means for scanningly deflecting the information beam in a major scanning direction;

an assembly for containing therein said information beam producing means, said deflecting means and a photosensitive member, movable in a minor scanning direction, which is exposed to the information beam at an exposure station, said assembly comprising a first assembly section and a second assembly section, said first assembly section being connected to said second assembly section pivotably about shaft means; and means for supporting said deflecting means in said assembly at a position located adjacent said shaft means, said supporting means being fixed to said first assembly section and engaged with said shaft means.

2. An apparatus according to claim 1, wherein said deflecting means includes a rotatable mirror and a motor, for driving the mirror, fixed to said supporting means, and the rotatable mirror is fixed to an output shaft of the motor.

3. An apparatus according to claim 2, wherein said deflecting means is located nearer to said shaft means than to the exposure station.

4. An apparatus according to claims 1, 2 or 3, wherein said supporting means is rotatably engaged with said shaft means through a hole in said supporting means.

5. An image recording apparatus, comprising:

an assembly for containing semiconductor laser means, actuable in accordance with an information signal to be recorded, for producing an information beam corresponding to the signal; means for scanningly deflecting the information beam in a major scanning direction; a photosensitive member, rotatable in a minor scanning direction which is exposed to the information beam at an exposure station; means for transferring an image formed on said photosensitive member onto a transfer material at a transfer station; means for fixing the transferred image on the transfer material; and means for guiding the transfer material from the transfer station to said fixing means, said guiding means being contacted by the back face of the transfer material, said assembly comprising a first assembly section and a second assembly section, said first assembly section including at least said semiconductor laser means, said photosensitive member and said deflecting means, and said second assembly section including at least said guiding means;

shaft means for pivotably supporting said first assembly section to said second assembly section;

means for resiliently urging said first assembly section away from said second assembly section to open said assembly;

means for releasably locking, against said resilient means, said first assembly section to said second assembly section to close the assembly; and means for supporting said deflecting means in said assembly at a position located adjacent a side of said assembly closest to said shaft means, said supporting means being fixed to said first assembly section and engaged with said shaft means.

6. An apparatus according to claim 5, wherein said deflecting means is located nearer to said shaft means than to the exposure station.

7. An apparatus according to claim 6, wherein said deflecting means includes a rotatable mirror and a motor, for driving the mirror, fixed to said supporting means, and the rotatable mirror is fixed to an output shaft of the motor.

8. An apparatus according to claim 7, wherein said transfer means and said fixing means are provided in said second assembly section.

9. An apparatus according to claims 5, 6, 7 or 8, wherein said supporting means is rotatably engaged with said shaft means through a hole in said supporting means.

* * * * *

UNITED STATES PATENT AND TRADEMARK OFFICE
CERTIFICATE OF CORRECTION

PATENT NO. : 4,673,956

DATED : June 16, 1987

INVENTOR(S) : Hiroo Kobayashi

It is certified that error appears in the above-identified patent and that said Letters Patent is hereby corrected as shown below:

COLUMN 1

Line 40, delete "of the apparatus".

COLUMN 2

Line 12, "cross-section" should read --cross section--.
Line 15, "cross-section" should read --cross section--.
Line 44, "sense" should read --direction--.
Line 60, "16, paper" should read --16 and paper--.

COLUMN 3

Line 46, delete "a".

COLUMN 5

Line 4, "galvano mirror" should read --galvanomirror--.

Signed and Sealed this

Twenty-fourth Day of November, 1987

*Attest:*

DONALD J. QUIGG

*Attesting Officer* *Commissioner of Patents and Trademarks*